United States Patent
Saito

(10) Patent No.: US 9,798,121 B2
(45) Date of Patent: Oct. 24, 2017

(54) FINDER AND IMAGING APPARATUS

(71) Applicant: FUJIFILM Corporation, Tokyo (JP)

(72) Inventor: Hiroki Saito, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 15/224,826

(22) Filed: Aug. 1, 2016

(65) Prior Publication Data

US 2017/0059833 A1    Mar. 2, 2017

(30) Foreign Application Priority Data

Aug. 25, 2015  (JP) .................................. 2015-165367

(51) Int. Cl.
| | |
|---|---|
| *G02B 23/14* | (2006.01) |
| *G02B 15/15* | (2006.01) |
| *G02B 13/04* | (2006.01) |
| *G02B 25/00* | (2006.01) |
| *G02B 27/10* | (2006.01) |

(52) U.S. Cl.
CPC ............. *G02B 15/15* (2013.01); *G02B 13/04* (2013.01); *G02B 25/001* (2013.01); *G02B 27/106* (2013.01)

(58) Field of Classification Search
CPC ........ G03B 13/06; G03B 13/08; G03B 17/20; G03B 13/10; G02B 23/14; G02B 25/001; G02B 13/04; G02B 15/15; G02B 15/161; G02B 23/04; G02B 23/145; G02B 27/106; G02B 27/126; G02B 7/1805; H04N 5/23293; H04N 5/23296

See application file for complete search history.

(56) References Cited

U.S. PATENT DOCUMENTS

| | | | | |
|---|---|---|---|---|
| 4,697,882 | A | * 10/1987 | Sato | ..................... G02B 7/1805 359/211.1 |
| 5,781,281 | A | * 7/1998 | Miyano | ..................... G01C 3/08 356/4.01 |
| 2003/0112355 | A1 | * 6/2003 | Bittner | ................. H04N 5/2251 348/333.01 |
| 2012/0038991 | A1 | 2/2012 | Miyano | |

(Continued)

FOREIGN PATENT DOCUMENTS

| | | |
|---|---|---|
| JP | 2001-311982 A | 11/2001 |
| JP | 2012-042569 A | 3/2012 |

*Primary Examiner* — Bumsuk Won
*Assistant Examiner* — Balram Parbadia
(74) *Attorney, Agent, or Firm* — Studebaker & Brackett PC

(57) ABSTRACT

A finder is a reverse Galileo type finder comprising, in order from the object side to the eye point side: an objective lens group having a negative refractive power; and an eyepiece lens group having a positive refractive power. The distance between the objective lens group and the eyepiece lens group is the longest distance from among distances between lenses, as an air converted length, in an observation optical system from the objective lens group to the eyepiece lens group. The eyepiece lens group consists of, in order from the object side to the eye point side: a first lens having a negative refractive power; a second lens having a positive refractive power; and a third lens having a negative refractive power. The first lens and the third lens are fixed while the second lens moves in the direction of the optical axis during diopter adjustment.

11 Claims, 10 Drawing Sheets

(56) References Cited

U.S. PATENT DOCUMENTS

2012/0099206 A1* 4/2012 Kubota ............... G02B 25/001
  359/645
2014/0270746 A1* 9/2014 Saito .................... G03B 13/06
  396/379

* cited by examiner

EXAMPLE 4    DISPLAY OPTICAL SYSTEM

FINDER AND IMAGING APPARATUS

CROSS REFERENCE TO RELATED APPLICATIONS

The present application claims priority under 35 U.S.C. §119 to Japanese Patent Application No. 2015-165367 filed on Aug. 25, 2015. The above application is hereby expressly incorporated by reference, in its entirety, into the present application.

BACKGROUND

The present disclosure is related to a reverse Galileo type finder capable of diopter adjustment and an imaging apparatus equipped with the finder.

Conventionally, reverse Galileo type finders such as that disclosed in Japanese Unexamined Patent Publication No. 2012-042569 are employed as finders for cameras, etc. In the finder disclosed in Japanese Unexamined Patent Publication No. 2012-042569, an objective lens group having a negative refractive power and an eyepiece lens group having a positive refractive power are provided in this order from the object side to the eye point side.

Moving an eyepiece lens group of a finder in the direction of the optical axis to adjust diopter is a known method for adjusting the diopter of a finder. For example, Japanese Unexamined Patent Publication No. 2001-311982 discloses an albada type finder equipped with a positive lens that functions as an eyepiece lens and moves in the direction of the optical axis when adjusting diopter.

SUMMARY

Miniaturization is advancing in imaging apparatuses such as cameras, and there is demand for finders to also be configured in a compact manner. For this reason, it is desired for the amount of movement of a lens that moves to adjust diopter to be suppressed when adjusting the diopter of a finder. Meanwhile, there is also demand for an appropriately large amount of diopter adjustment to be secured.

However, in a reverse Galileo type finder, the focal length of each lens group is substantially determined by the size in the direction of the optical axis and the magnification ratio thereof. Therefore, the amount of movement per amount of diopter adjustment is also determined in a finder that adjusts diopter by moving the entirety of an eyepiece lens group.

Japanese Unexamined Patent Publication No. 2012-042569 does not disclose a specific method for adjusting diopter. In the optical system disclosed in Japanese Unexamined Patent Publication No. 2012-042569, an eyepiece lens group is constituted by a single positive lens. A half prism or a half mirror is provided between an objective lens group and the eyepiece lens group, to enable observation of an observation image formed by an observation optical system overlapped with information such as a field of view frame. If the eyepiece lens group is moved to adjust diopter in such an optical system, a sufficient amount of space for the eyepiece lens group to move in cannot be secured because it is necessary to avoid interference with the provided mirror or prism. As a result, the amount of diopter adjustment will be limited.

The optical system disclosed in Japanese Unexamined Patent Publication No. 2001-311982 was developed, taking suppression of the amount of movement of a diopter adjusting lens into consideration. However, it cannot be said that the amount of movement per amount of diopter adjustment is sufficiently suppressed, considering recent demand for a large amount of diopter adjustment and compact configurations.

The present disclosure has been developed in view of the foregoing circumstances. The present disclosure provides a finder that suppresses the amount of movement of a lens per amount of diopter adjustment, which is advantageous from the viewpoint of miniaturization, and realizes favorable optical performance. The present disclosure also provides an imaging apparatus equipped with this finder.

A finder of the present disclosure is a reverse Galileo type finder comprising, in order from the object side to the eye point side:

an objective lens group having a negative refractive power; and an eyepiece lens group having a positive refractive power;

the distance between the objective lens group and the eyepiece lens group being the longest distance from among distances between lenses, as an air converted length, in an observation optical system from the objective lens group to the eyepiece lens group;

the eyepiece lens group consisting of, in order from the object side to the eye point side: a first lens having a negative refractive power; a second lens having a positive refractive power; and a third lens having a negative refractive power; and the first lens and the third lens being fixed while the second lens moves in the direction of the optical axis during diopter adjustment.

In the finder of the present disclosure, it is preferable for at least one of Conditional Formulae (1) through (3), (1-1) through (3-1), and (1-2) below to be satisfied.

$$0.05 < fN/f3 < 0.5 \tag{1}$$

$$0.1 < fN/f3 < 0.4 \tag{1-1}$$

$$0.15 < fN/f3 < 0.36 \tag{1-2}$$

$$0.55 < D/f2 < 1.5 \tag{2}$$

$$0.6 < D/f2 < 1 \tag{2-1}$$

$$0.1 < m \cdot f1/f3 < 0.8 \tag{3}$$

$$0.15 < m \cdot f1/f3 < 0.6 \tag{3-1}$$

wherein fN is the focal length of the objective lens group, f1 is the focal length of the first lens, f3 is the focal length of the third lens, f2 is the focal length of the second lens, D is the air converted length from the lens surface most toward the eye point side within the objective lens group to the lens surface most toward the object side within the eyepiece lens group, and m is the angular magnification ratio of the observation optical system in a state in which the diopter is −1.

The finder of the present disclosure may further comprise an optical system separate from the observation optical system outside the optical path of the observation optical system, and an optical path combining member that combines the optical path of the separate optical system and the optical path of the observation optical system, provided between the objective lens group and the eyepiece lens group. In this case, it is preferable for the separate optical system to consist of two lenses having positive refractive powers and one lens having a negative refractive power.

An imaging apparatus of the present disclosure is equipped with the finder of the present disclosure.

Note that the expression "comprising, in order from the object side to the eye point side: an objective lens group having a negative refractive power; and an eyepiece lens group having a positive refractive power" includes configurations in which the constituent elements are provided in this order continuously or discontinuously.

Note that the term "lenses" in the expression "distances between lenses" refers to lenses that practically have refractive power.

Note that the expressions "consisting of" and "consist of" refers to essential elements, and means that lenses that practically do not have any refractive power, optical elements other than lenses, such as a stop, a cover glass, and filters, a lens flange, a lens barrel, etc., may also be included in addition to the constituent elements listed above.

Note that the signs the refractive powers of the lens groups and the signs of the refractive powers of the lenses are considered in the paraxial region for those that include aspherical surfaces.

According to the present disclosure, the eyepiece lens group of a reverse Galileo type finder consists of, in order from the object side to the eye point side, the negative lens, the positive lens, and the negative lens, of which only the positive lens moves during diopter adjustment. Therefore, a finder that suppresses the amount of movement of the lens per amount of diopter adjustment, which is advantageous from the viewpoint of miniaturization, and realizes favorable optical performance can be realized. In addition, an imaging apparatus equipped with this finder can be provided.

DETAILED DESCRIPTION OF THE PREFERRED EMBODIMENTS

Figure 1:
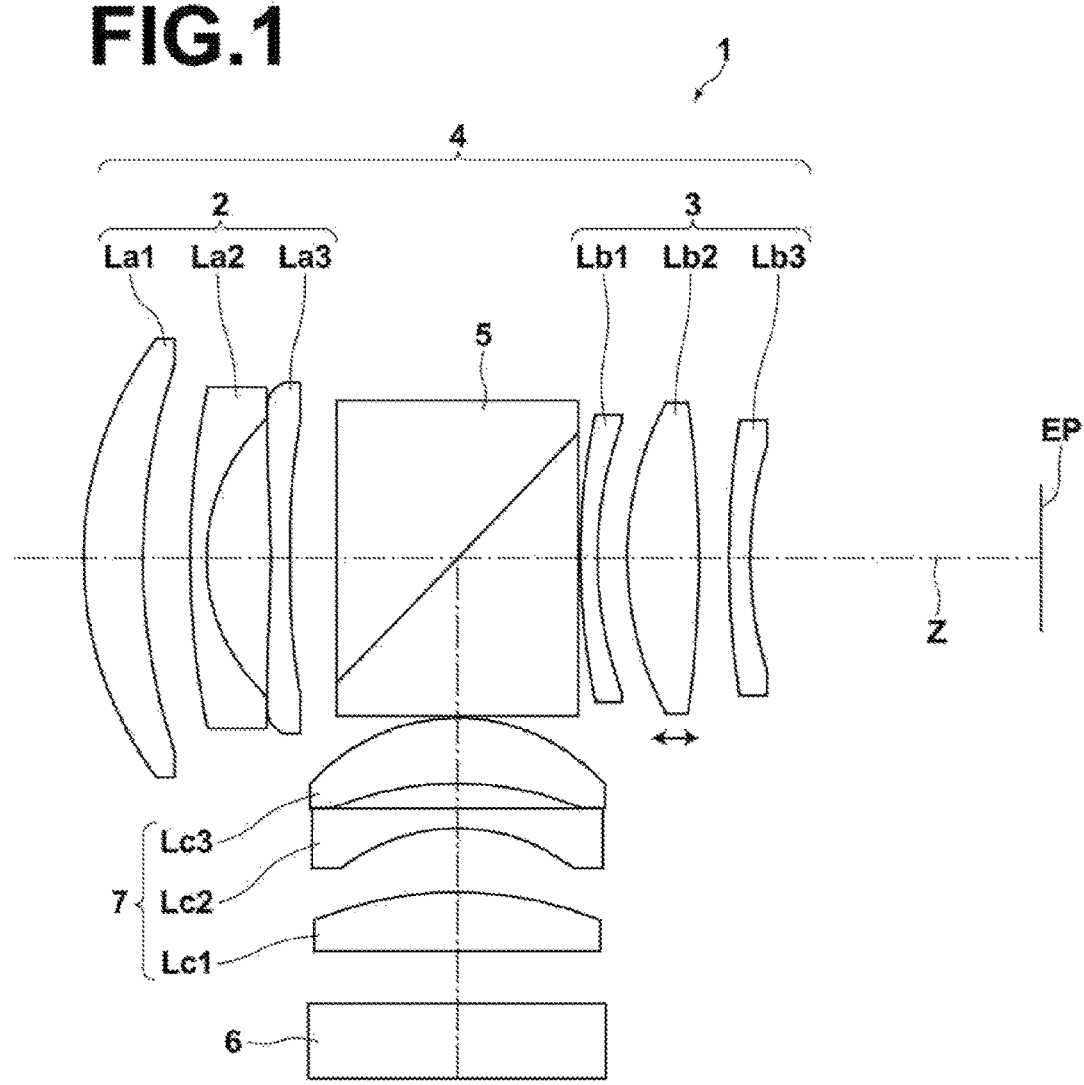
FIG. 1 is a cross sectional diagram that illustrates the configuration of a finder according to an embodiment of the present disclosure.

Hereinafter, embodiments of the present disclosure will be described in detail with reference to the attached drawings. FIG. 1 illustrates the configuration of a finder according to an embodiment of the present disclosure. The configuration illustrated in FIG. 1 corresponds to a finder of Example 1 to be described later. In FIG. 1, the left side of the drawing sheet is the object side, and the right side of the drawing sheet is the eye point side.

The finder 1 illustrated in FIG. 1 is a reverse Galileo type finder, comprising an objective lens group 2 having a negative refractive power and an eyepiece lens group 3 having a positive refractive power, which are provided in this order from the object side to the eye point side along an optical axis Z. The optical system from the objective lens group 2 to the eyepiece lens group 3 constitutes an observation optical system 4. Observed images formed by the observation optical system 4 are observed at an eye point EP. Note that FIG. 1 illustrates an example in which an optical path combining member 5 which does not have any refractive power is provided between the objective lens group 2 and the eyepiece lens group 3. The observation optical system 4 may be constituted by the objective lens group 2, the member which does not have any refractive power, and the eyepiece lens group 3 in this manner. Alternatively, the observation optical system 4 may be constituted by the objective lens group 2 and the eyepiece lens group 3.

The objective lens group 2 and the eyepiece lens group 3 are positioned such that the distance between the objective lens group 2 and the eyepiece lens group 3 is the longest distance from among distances between lenses in the observation optical system 4, as an air converted length. Note that here, the expression "distances between lenses . . . as an air converted length" refers to distances between lenses which are adjacent to each other in the direction of the optical axis, as air converted lengths. In the case that members that do not have any refractive power are provided between lenses, such members are converted as air.

The objective lens group 2 of FIG. 1 is constituted by three lenses, which are, in order from the object side to the eye point side: a lens La1, a lens La2, and a lens La3. However, as shown in the Examples to be described later, the objective lens group 2 may be constituted by a number of lenses different from that of the example illustrated in FIG. 1.

The eyepiece lens group 3 is constituted by, in order from the object side to the eye point side: a first lens Lb1 having a negative refractive power, a second lens Lb2 having a positive refractive power, and a third lens Lb3 having a negative refractive power. The eyepiece lens group 3 is configured such that the first lens Lb1 and the third lens Lb3 are fixed while the second lens Lb2 moves in the direction of the optical axis during diopter adjustment. That is, the finder 1 is configured such that only a portion of the lenses of the eyepiece lens group 3 moves during diopter adjustment, and the second lens Lb2 functions as a diopter adjusting lens.

By configuring the eyepiece lens group 3 having a positive refractive power in the manner described above, the refractive power of the second lens Lb2, which is a positive lens, can be increased. It will become possible to suppress the amount of movement per amount of diopter adjustment, by moving this second lens Lb2 to perform diopter adjustment. In addition, by configuring lenses that constitute the eyepiece lens group 3 such that the signs of the refractive powers thereof are negative, positive, and negative in this order from the object side to the eye point side, the air converted distance between the objective lens group 2 and the eyepiece lens group 3 can be secured in order to avoid interference with a mirror or a prism provided in this space, while the size of the optical system in the outer radial direction can be suppressed. Assuming that the arrangement of refractive powers is negative, negative, and positive, this configuration is disadvantageous from the viewpoint of securing the air converted distance between the objective lens group 2 and the eyepiece lens group 3. In the case that the arrangement of refractive powers is positive, negative, and negative, this configuration is disadvantageous from the viewpoint of suppressing the size of the optical system in the outer radial direction. Accordingly, the finder 1 of the present embodiment is of a configuration that secures an appropriate amount of diopter adjustment, which is also advantageous from the viewpoint of miniaturization.

More specifically, it is preferable for the first lens Lb1 to be of a shape having a concave surface toward the eye point side. In this case, correction of field curvature is facilitated. It is preferable for the second lens Lb2 to be of a biconvex shape, in order to secure a strong refractive power. The third lens Lb3 may be an aspherical lens in order to obtain more favorable optical performance.

Note that this finder 1 may be equipped with a separate optical system other than the observation optical system outside the optical path of the observation optical system 4, and an optical path combining member 5 that combines the optical path of the separate optical system and the optical path of the observation optical system 4 may be provided between the objective lens group 2 and the eyepiece lens group 3 as in the example illustrated in FIG. 1. A member that includes a semitransmissive member that divides incident light into transmitted light and reflected light may be employed as the optical path combining member 5. Specific examples of such a member include a half prism and a half mirror.

In FIG. 1, a half prism having a semitransmissive film in the interior thereof is employed as the optical path combining member 5, and the separate optical system is equipped with a target lens group 7. A display member 6 is positioned along the optical path of the target lens group 7 opposite the optical path combining member 5. The display member 6 displays a field of view frame and various other pieces of information, for example. The target lens group 7 guides light from the display member 6 to the optical path combining member 5 and the eyepiece lens group 3. The target lens group 7, the optical path combining member 5, and the eyepiece lens group 3 constitute a display optical system. This configuration enables a field of view frame and various other pieces of information to be overlapped and displayed on observed images obtained by the observation optical system 4.

It is preferable for the target lens group 7 to consist of two lenses having positive refractive powers and one lens having a negative refractive power. In this case, the number of negative lenses and positive lenses will be the same in a lens system that combines the target lens group 7 and the eyepiece lens group 3, and correction of various aberrations in the target lens group 7 will be facilitated. The target lens group 7 in the example illustrated in FIG. 1 is constituted by, in order from the side of the display member, a positive lens Lc1, a negative lens Lc2, and a positive lens Lc3. The target lens group 7 may have a lens arrangement which is different from that of the example illustrated in FIG. 1. For example, the target lens group 7 may be constituted by, in order from the side of the display member, a negative lens, a positive lens, and a positive lens.

It is preferable for Conditional Formula (1) below to be satisfied in the finder 1.

$$0.05 < fN/f3 < 0.5 \quad (1)$$

wherein fN is the focal length of the objective lens group, and f3 is the focal length of the third lens.

Conditional Formula (1) defines the ratio of refractive powers of the objective lens group 2, which is a negative lens group, and the negative third lens Lb3 in the eyepiece lens group 3. By configuring the finder such that the value of fN/f3 is not less than or equal to the lower limit defined in Conditional Formula (1), the refractive power of the third lens Lb3 can be secured. As a result, correction of spherical aberration will be facilitated. By configuring the finder such that the value of fN/f3 is not greater than or equal to the upper limit defined in Conditional Formula (1), the refractive power of the third lens Lb3 can be prevented from becoming excessively strong. As a result, excessive correction of spherical aberration can be prevented, and it will be possible for spherical aberration to be favorably corrected.

It is more preferable for Conditional Formula (1-1) below to be satisfied, and even more preferable for Conditional Formula (1-2) below to be satisfied, in order to cause the advantageous effects related to Conditional Formula (1) to become more prominent.

$$0.1 < fN/f3 < 0.4 \quad (1\text{-}1)$$

$$0.15 < fN/f3 < 0.36 \quad (1\text{-}2)$$

In addition, it is preferable for Conditional Formula (2) below to be satisfied in the finder 1.

$$0.55 < D/f2 < 1.5 \quad (2)$$

wherein D is the air converted length from the lens surface most toward the eye point side within the objective lens group to the lens surface most toward the object side within the eyepiece lens group, and f2 is the focal length of the second lens.

Conditional Formula (2) defines the ratio between the air converted length of the distance between the objective lens group 2 and the eyepiece lens group 3 and the focal length of the positive second lens Lb2. By configuring the finder such that the value of D/f2 is not less than or equal to the lower limit defined in Conditional Formula (2), the refractive power of the second lens Lb2, which is the diopter adjusting lens, can be secured. As a result, the amount of movement of the second lens Lb2 per amount of diopter adjustment can be decreased. Therefore, securing space for diopter adjustment will be facilitated without increasing the size of the apparatus. By configuring the finder such that the value of D/f2 is not greater than or equal to the upper limit defined in Conditional Formula (2), the refractive power of the second lens Lb2 can be prevented from becoming excessively strong. As a result, suppressing fluctuations in aberrations during diopter adjustment will be facilitated.

It is more preferable for Conditional Formula (2-1) below to be satisfied, in order to cause the advantageous effects related to Conditional Formula (2) to become more prominent.

$$0.6 < D/f2 < 1 \qquad (2\text{-}1)$$

In addition, it is preferable for Conditional Formula (3) below to be satisfied in the finder 1.

$$0.1 < m \cdot f1/f3 < 0.8 \qquad (3)$$

wherein m is the angular magnification ratio of the observation optical system in a state in which the diopter is −1, f1 is the focal length of the first lens, and f3 is the focal length of the third lens.

Conditional Formula (3) defines the product of the ratio between the power of the negative first lens Lb1 and the power of the negative third lens Lb3 and the angular magnification ratio of the observation optical system 4. By configuring the finder such that the value of m·f1/f3 is not less than or equal to the lower limit defined in Conditional Formula (3), the refractive powers of the lenses more toward the object side than the second lens Lb2 can be prevented from becoming excessively strong. As a result, correction of generated aberrations by the second lens Lb2 and the third lens Lb3 will be facilitated. By configuring the finder such that the value of m·f1/f3 is not greater than or equal to the upper limit defined in Conditional Formula (3), the refractive power of the third lens Lb3 can be prevented from becoming excessively strong. As a result, correction of generated aberrations with lenses other than the third lens Lb3 will be facilitated.

It is more preferable for Conditional Formula (3-1) below to be satisfied, in order to cause the advantageous effects related to Conditional Formula (3) to become more prominent.

$$0.15 < m \cdot f1/f3 < 0.6 \qquad (3\text{-}1)$$

Arbitrary combinations of the preferable configurations and possible configurations described above, including the configurations related to the conditional formulae, are possible. It is preferable for these configurations to be selected as appropriate according to desired specifications. For example, it is possible to realize a finder having a compact lens system and a large amount of diopter adjustment, by adopting the above configurations as appropriate, for example. Here, a "large amount of diopter adjustment" refers to a range from −3 diopters to +1.5 diopters or greater.

Next, examples of numerical values of the finder of the present disclosure will be described. The finders of Examples 1 through 4 to be described below are those in which an optical path combining member 5 is provided between an objective lens group 2 and an eyepiece lens group 3, and have an observation optical system as well as a display optical system.

EXAMPLE 1

Figure 2:
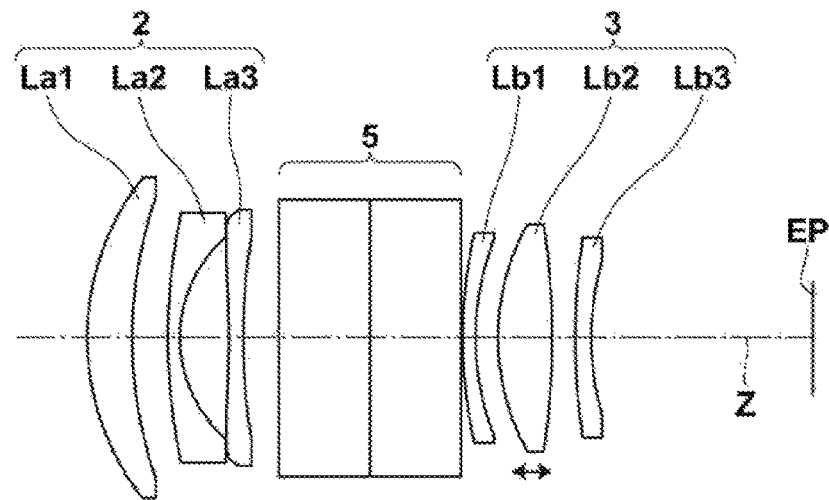
FIG. 2 is a cross sectional diagram that illustrates the configuration of an observation optical system of a finder of Example 1 of the present disclosure.
Figure 3:
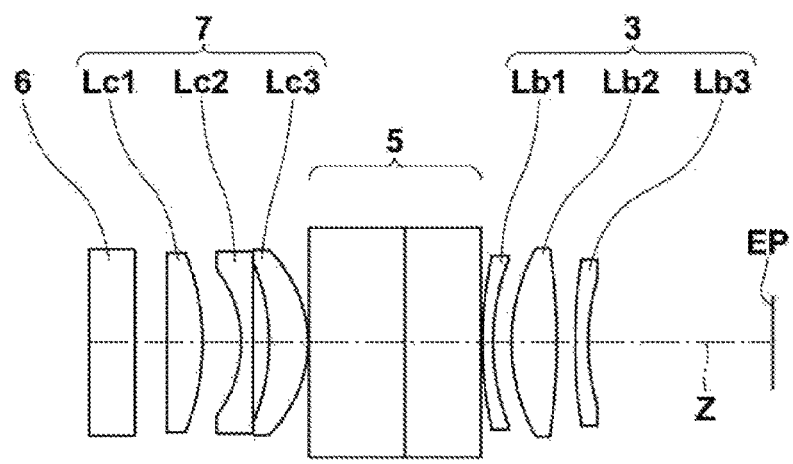
FIG. 3 is a cross sectional diagram that illustrates the configuration of a display optical system of the finder of Example 1 of the present disclosure.

Example 1 is suited as a configuration of a finder which is compatible with the angle of view of a photography lens having a 35 mm equivalent focal length of approximately 50 mm. FIG. 2 and FIG. 3 are cross sectional diagrams of an observation optical finder and a display optical system of the finder of Example 1, respectively.

The observation optical system illustrated in FIG. 2 is constituted by, in order from the object side to the eye point side, an objective lens group 2 having a negative refractive power, an optical path combing member 5, which is a prism, and an eyepiece lens group 3 having a positive refractive power. The objective lens group 2 is constituted by, in order from the object side to the eye point side, a positive lens La1, a negative lens La2, and a negative lens La3. The eyepiece lens group 3 is constituted by, in order from the object side to the eye point side, a negative lens Lb1, a positive lens Lb2, and a negative lens Lb3. Only the second lens Lb2 moves in the direction of the optical axis during diopter adjustment.

The display optical system illustrated in FIG. 3 is constituted by, in order from a display member 6 to the eye point side, the display member 6, a target lens group 7, the optical path combing member 5, which is a prism, and the eyepiece lens group 3 having a positive refractive power. The target lens group 7 is constituted by, in order from the side of the display member, a positive lens Lc1, a negative lens Lc2, and a positive lens Lc3. A semitransmissive film for combining optical paths is provided within the prism, and the prism combines the optical path of the target lens group 7 provided outside the optical path of the observation optical system and the optical path of the observation optical system. Thereby, display of the display member 6 is overlapped within observation images obtained by the observation optical system. Note that the optical path of the display optical path is a bent optical path as illustrated in FIG. 1. However, the optical path is spread in FIG. 3 in order to facilitate understanding.

Basic lens data, variable distances between surfaces, and items related to the d line are shown in Table 1, and aspherical surface coefficients are shown in Table 2 for the observation optical system. In Table 1, ith (i=1, 2, 3, . . . ) surface numbers that sequentially increase toward the eye point side with the surface of the constituent element most toward the object side being designated as 1 are listed in the column Si; the radii of curvature of ith surfaces are listed in the column Ri; and distances along the optical axis Z between an ith surface and an i+1st surface are listed in the column Di. In addition, the refractive indices with respect to the d line (wavelength: 587.6 nm) of jth (j=1, 2, 3, . . . ) constituent elements, j being the number of constituent elements with the constituent element most toward the object side designated as 1 and sequentially increasing toward the eye point side, are listed in the column Ndj; and the Abbe's numbers with respect to the d line of jth constituent elements are listed in the column vdj.

Here, the signs of the radii of curvature are positive in cases that the surface shape is convex toward the object side, and negative in cases that the surface shape is convex toward the eye point side. Table 1 also shows the semitransmissive film within the prism as a surface. The value in the lowermost row in the column Di is the distance between the lens surface most toward the eye point side within the eyepiece lens group 3 and the eye point EP. In addition, in the basic lens data, variable distances between surfaces that change during diopter adjustment are represented by text reading "DD [ ]". The surface number of the surface toward the object side that defines the distance is written within the brackets "[ ]" and shown in the column Di. Each of the variable distances between surfaces for each diopter is shown in a table of variable distances between surfaces. In the table of variable distances between surfaces, "dpt" denotes diopters. In the table showing various items, the units for "Apparent Field of View" are degrees.

In the basic lens data, marks "*" are appended to the surface numbers of aspherical surfaces, and numerical values representing paraxial radii of curvature are shown for the aspherical surfaces in the column that show radii of curvature. Table 2 shows aspherical surface coefficients of the aspherical surfaces. "E-n" (n is an integer) shown in the numerical values that represent the aspherical surface coefficients in Table 2 mean "·10$^{-n}$". The aspherical surface coefficients are the values of coefficients KA, Am (m=3, 4, 5, . . . , 16 or m=4, 6, 8, . . . , 18) in the aspherical surface formula shown below.

$$Zd = \frac{C \times h^2}{1 + \sqrt{1 - KA \times C^2 \times h^2}} + \sum_m Am \times h^m$$

wherein Zd is the depth of the aspherical surface (the length of a normal line that extends from a point on the aspherical surface at a height h to a plane perpendicular to the optical axis that contacts the apex of the aspherical surface), h is the height (the distance from the optical axis to the lens surface), C is the paraxial curvature, and KA and Am are aspherical surface coefficients (m=3, 4, 5, . . . , 16 or m=4, 6, 8, . . . , 18).

Degrees are employed as units for angles, and mm are employed as units for lengths in the data of each table. In addition, numerical values which are rounded off at a predetermined number of digits are shown in the tables below.

TABLE 1

Example 1: Observation Optical System

Basic Lens Data

| Si | Ri | Di | Ndj | vdj |
|---|---|---|---|---|
| 1 | 16.2350 | 2.7900 | 1.91082 | 35.25 |
| 2 | 26.9147 | 2.2257 | | |
| 3 | 37.3522 | 0.7500 | 1.81600 | 46.62 |
| 4 | 8.4129 | 3.0591 | | |
| *5 | −27.1686 | 0.9000 | 1.80462 | 40.77 |
| *6 | 348.8534 | 2.1892 | | |
| 7 | ∞ | 5.7000 | 1.85150 | 40.78 |
| 8 | ∞ | 5.7000 | 1.85150 | 40.78 |
| 9 | ∞ | 0.1000 | | |
| 10 | 30.2836 | 0.8000 | 1.90366 | 31.31 |
| 11 | 17.1164 | DD [11] | | |
| 12 | 14.6078 | 3.3800 | 1.88300 | 40.76 |
| 13 | −48.7245 | DD [13] | | |
| *14 | 40.6872 | 1.0000 | 1.68400 | 31.30 |
| *15 | 18.7611 | 13.8413 | | |

Variable Distances Between Surfaces

| Diopter | −1.0 dpt | +2.0 dpt | −4.0 dpt |
|---|---|---|---|
| DD [11] | 1.3313 | 2.1817 | 0.5317 |
| DD [13] | 1.4779 | 0.6275 | 2.2775 |

Items

| Angular Magnification Ratio | 0.595 |
|---|---|
| Apparent Field of View | 29.2 |

TABLE 2

Example 1: Observation Optical System
Aspherical Surface Coefficients

| | Surface Number | |
|---|---|---|
| | 5 | 6 |
| KA | 3.1468467E−01 | −4.9979999E+00 |
| A3 | 0.0000000E+00 | 0.0000000E+00 |
| A4 | 2.0402403E−03 | 1.5198291E−03 |
| A5 | −1.5660358E−04 | 1.8972030E−04 |
| A6 | −5.8151172E−05 | −2.2080544E−04 |
| A7 | −4.9308257E−05 | 2.9203453E−05 |
| A8 | 2.6146767E−05 | −8.5243190E−06 |
| A9 | −4.4375384E−06 | 5.0776942E−06 |
| A10 | 2.6652010E−07 | −9.3767813E−07 |
| A11 | 2.2379409E−08 | 3.1920514E−09 |
| A12 | −3.1146059E−09 | 1.8896795E−08 |
| A13 | −1.1900030E−09 | −2.5908547E−09 |
| A14 | 3.3810099E−10 | 1.4991103E−10 |
| A15 | −3.1998496E−11 | −1.7533672E−12 |
| A16 | 1.0759893E−12 | −1.6260314E−13 |

| | Surface Number | |
|---|---|---|
| | 14 | 15 |
| KA | 8.6368139E−01 | 1.2015365E+00 |
| A4 | −5.3696590E−07 | 8.7628554E−05 |
| A6 | −4.2140008E−07 | 4.2717282E−07 |
| A8 | 1.9049099E−08 | −5.5860605E−08 |
| A10 | 5.2874523E−10 | 6.1771113E−10 |
| A12 | 1.8003018E−11 | 2.8037465E−10 |
| A14 | 2.4642133E−13 | 1.1214600E−12 |
| A16 | −1.1639331E−14 | −3.3762480E−13 |
| A18 | −6.0123325E−16 | 2.0922875E−15 |

Basic lens data and various items related to the d line are shown in Table 3, and aspherical surface coefficients are shown in Table 4 for the display optical system in a similar manner. In the table that shows basic lens data, surface numbers that sequentially increase from the object side to the eye point side with the surface toward the object side of the constituent element most toward the side of the display member designated as 1 are shown as surface numbers of the surfaces of the constituent elements. The focal length in the table that shows various items is the focal length of the display optical system.

TABLE 3

Example 1: Display Optical System

Basic Lens Data

| Si | Ri | Di | Ndj | vdj |
|---|---|---|---|---|
| 1 | ∞ | 3.4150 | 1.49023 | 57.49 |
| 2 | ∞ | 2.4000 | | |
| 3 | ∞ | 2.6800 | 1.68893 | 31.07 |
| 4 | −18.5174 | 2.8918 | | |
| 5 | −9.1948 | 0.9000 | 1.89286 | 20.36 |
| 6 | ∞ | 1.2056 | | |
| 7 | −15.8632 | 2.9500 | 1.77250 | 49.60 |
| 8 | −9.5542 | 0.1000 | | |
| 9 | ∞ | 7.2000 | 1.85150 | 40.78 |
| 10 | ∞ | 5.7000 | 1.85150 | 40.78 |
| 11 | ∞ | 0.1000 | | |
| 12 | 30.2836 | 0.8000 | 1.90366 | 31.31 |
| 13 | 17.1164 | DD [11] | | |

TABLE 3-continued

Example 1: Display Optical System

| | | | | |
|---|---|---|---|---|
| 14 | 14.6078 | 3.3800 | 1.88300 | 40.76 |
| 15 | −48.7245 | DD [13] | | |
| *16 | 40.6872 | 1.0000 | 1.68400 | 31.30 |
| *17 | 18.7611 | 13.8413 | | |

| Items | |
|---|---|
| Focal Length | 23.15 |
| Apparent Field of View | 31.2 |

TABLE 4

Example 1: Display Optical System
Aspherical Surface Coefficients

| | Surface Number | |
|---|---|---|
| | 16 | 17 |
| KA | 8.6368139E−01 | 1.2015365E+00 |
| A4 | −5.3696590E−07 | 8.7628554E−05 |
| A6 | −4.2140008E−07 | 4.2717282E−07 |
| A8 | 1.9049099E−08 | −5.5860605E−08 |
| A10 | 5.2874523E−10 | 6.1771113E−10 |
| A12 | 1.8003018E−11 | 2.8037465E−10 |
| A14 | 2.4642133E−13 | 1.1214600E−12 |
| A16 | −1.1639331E−14 | −3.3762480E−13 |
| A18 | −6.0123325E−16 | 2.0922875E−15 |

Figure 9:
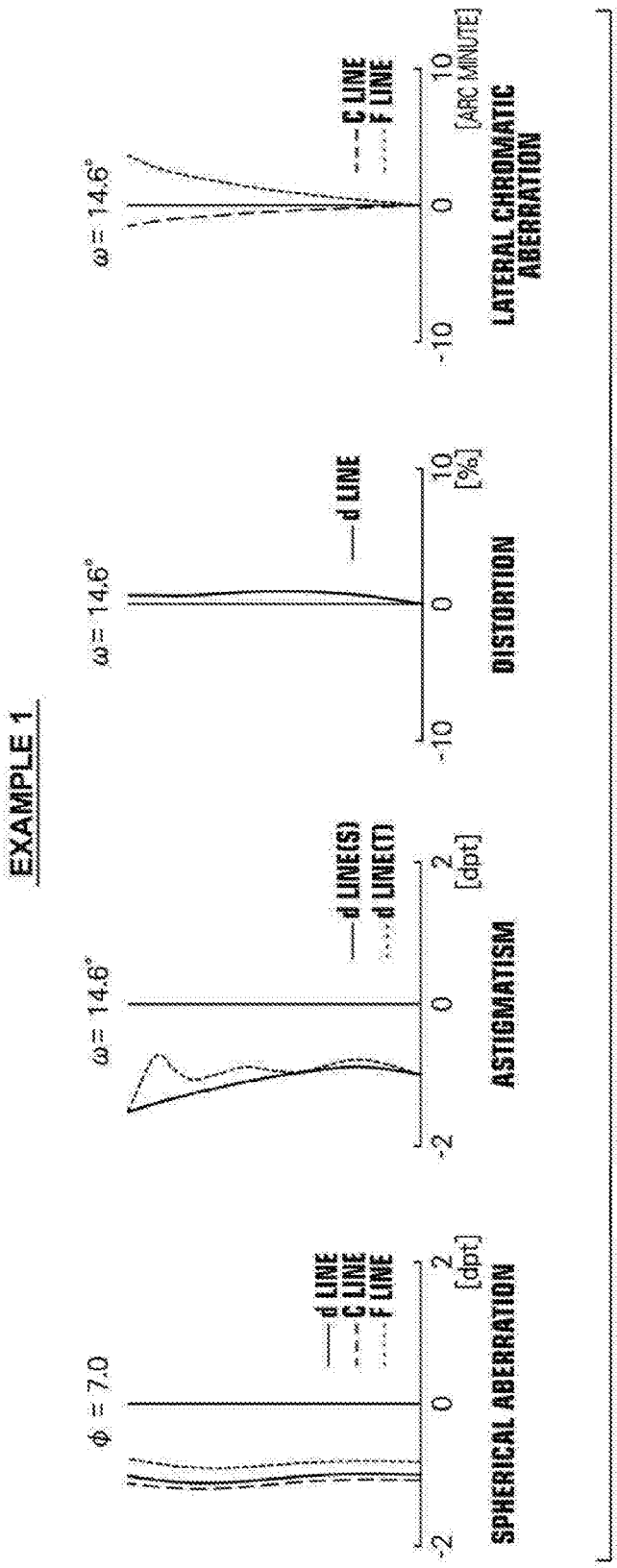
FIG. 9 is a collection of diagrams that illustrate aberrations of an observation optical system of the finder of Example 1, that illustrate spherical aberration, astigmatism, distortion, and lateral chromatic aberration in this order from the left side of the drawing sheet.

FIG. 9 is a collection of diagrams that illustrate aberrations of the observation optical system of Example 1 in a state in which the diopter is −1. The diagrams of FIG. 9 illustrate spherical aberration, astigmatism, distortion, and lateral chromatic aberration (aberration of magnification) in this order from the left side of the drawing sheet. The diagram that illustrates spherical aberration shows aberrations related to the d line (wavelength: 587.6 nm), the C line (wavelength: 656.3 nm), and the F line (wavelength: 486.1 nm), as a solid line, a long broken line, and a short broken line, respectively. In the diagram that illustrates astigmatism, aberrations in the sagittal direction and aberrations in the tangential direction related to the d line are indicated by a solid line and a short broken line, respectively. In the diagram that illustrates distortion, aberrations related to the d line are shown as a solid line. In the diagram that illustrates lateral chromatic diagram, aberrations related to the C line and the F line are shown as a long broken line and a short broken line, respectively. In the diagram that illustrates spherical aberration, "$\phi=7.0$" indicates that the diameter of the eye point is 7.0 mm. In the other diagrams that illustrate the aberrations, ω denotes half angles of view of the apparent field of view. The units of the horizontal axes of the spherical aberration diagram and the astigmatism diagram are diopters, and the units of the horizontal axis of the lateral chromatic aberration diagram are arc minutes.

The symbols, the meanings, and the manners in which the various pieces of data are described in the description of Example 1 above are the same for the examples to be described below unless otherwise noted. Therefore, redundant descriptions will be omitted hereinafter.

EXAMPLE 2

Figure 4:
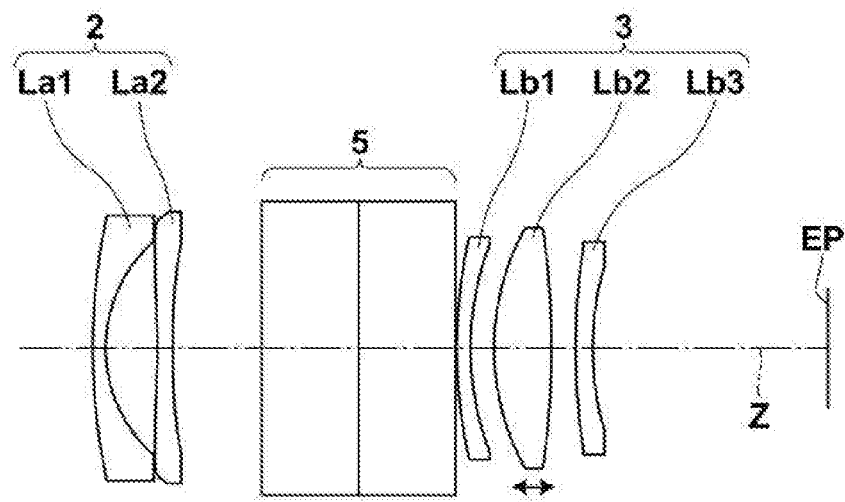
FIG. 4 is a cross sectional diagram that illustrates the configuration of an observation optical system of a finder of Example 2 of the present disclosure.

Example 2 is suited as a configuration of a finder which is compatible with the angle of view of a photography lens having a 35 mm equivalent focal length of approximately 28 mm. Example 2 is an optical system that has a different magnification ratio from the optical system of Example 1, by moving the positive lens La1 of the objective lens group 2 of Example 1 outside the optical path of the observation optical system, and feeding the remaining two negative lenses La2 and La3 toward the object side. FIG. 4 is a cross sectional diagram of an observation optical system of the finder of Example 2. A display optical system of Example 2 is the same as the display optical system of Example 1. Therefore, data and a drawing of the display optical system of Example 2 will be omitted.

The observation optical system illustrated in FIG. 4 is constituted by, in order from the object side to the eye point side, an objective lens group 2 having a negative refractive power, an optical path combining member 5, which is a prism, and an eyepiece lens group 3 having a positive refractive power. The objective lens group 2 is constituted by, in order from the object side to the eye point side, a negative lens La2 and a negative lens La3. The eyepiece lens group 3 is constituted by, in order from the object side to the eye point side, a negative first lens Lb1, a positive second lens Lb2, and a negative third lens Lb3. Only the second lens Lb2 moves in the direction of the optical axis during diopter adjustment.

Figure 10:
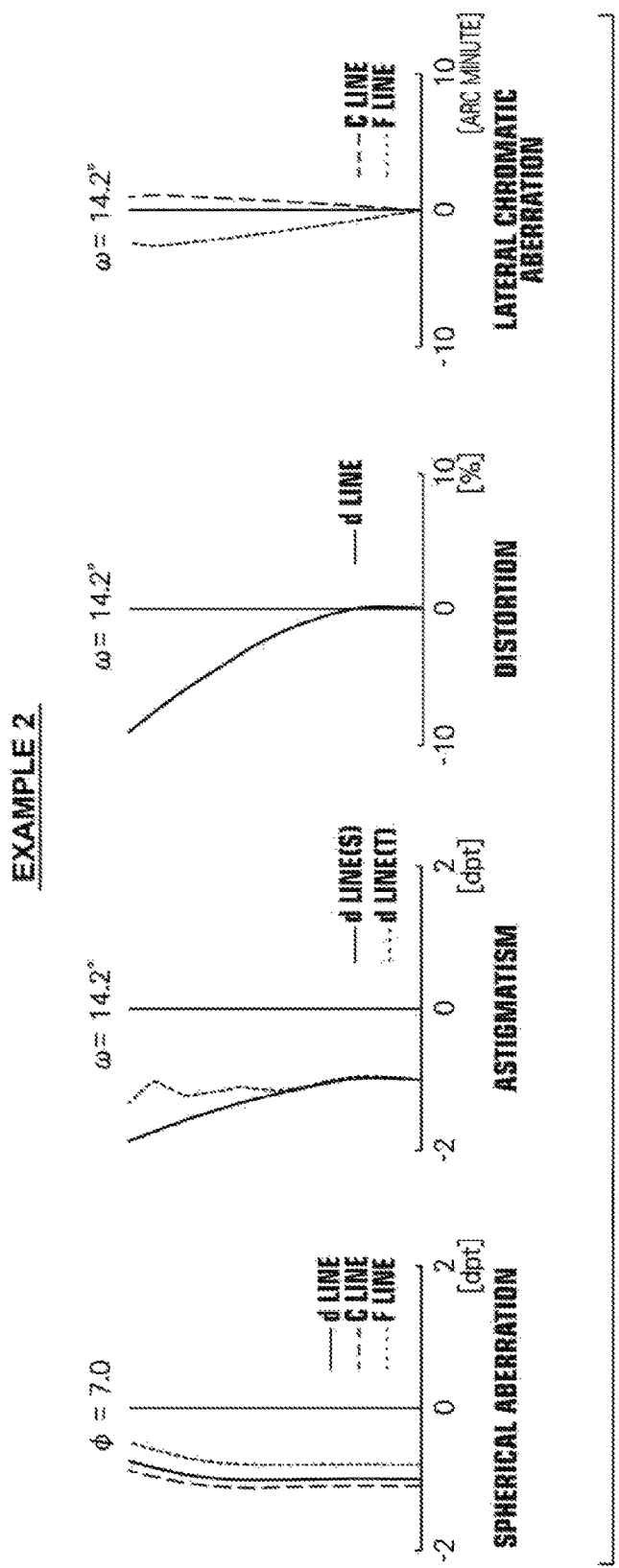
FIG. 10 is a collection of diagrams that illustrate aberrations of an observation optical system of the finder of Example 2, that illustrate spherical aberration, astigmatism, distortion, and lateral chromatic aberration in this order from the left side of the drawing sheet.

Basic lens data, variable distances between surfaces, and various items related to the d line are shown in Table 5, and aspherical surface coefficients are shown in Table 6 for the observation optical system. FIG. 10 is a collection of diagrams that illustrate various aberrations of the observation optical system in a state in which the diopter is −1.

TABLE 5

Example 2: Observation Optical System

Basic Lens Data

| Si | Ri | Di | Ndj | vdj |
|---|---|---|---|---|
| 1 | 37.3522 | 0.7500 | 1.81600 | 46.62 |
| 2 | 8.4129 | 3.0591 | | |
| *3 | −27.1686 | 0.9000 | 1.80462 | 40.77 |
| *4 | 348.8534 | 5.2333 | | |
| 5 | ∞ | 5.7000 | 1.85150 | 40.78 |
| 6 | ∞ | 5.7000 | 1.85150 | 40.78 |
| 7 | ∞ | 0.1000 | | |
| 8 | 30.2836 | 0.8000 | 1.90366 | 31.31 |
| 9 | 17.1164 | DD [11] | | |
| 10 | 14.6078 | 3.3800 | 1.88300 | 40.76 |
| 11 | −48.7245 | DD [13] | | |

TABLE 5-continued

Example 2: Observation Optical System

| | | | | |
|---|---|---|---|---|
| *12 | 40.6872 | 1.0000 | 1.68400 | 31.30 |
| *13 | 18.7611 | 13.8413 | | |

Variable Distances Between Surfaces

| Diopter | −1.0 dpt | +2.0 dpt | −4.0 dpt |
|---|---|---|---|
| DD [11] | 1.4103 | 2.2644 | 0.6080 |
| DD [13] | 1.3989 | 0.5448 | 2.2012 |

Items

| | |
|---|---|
| Angular Magnification Ratio | 0.361 |
| Apparent Field of View | 28.5 |

TABLE 6

Example 2: Observation Optical System
Aspherical Surface Coefficients

| | Surface Number | |
|---|---|---|
| | 3 | 4 |
| KA | 3.1468467E−01 | −4.9979999E+00 |
| A3 | 0.0000000E+00 | 0.0000000E+00 |
| A4 | 2.0402403E−03 | 1.5198291E−03 |
| A5 | −1.5660358E−04 | 1.8972030E−04 |
| A6 | −5.8151172E−05 | −2.2080544E−04 |
| A7 | −4.9308257E−05 | 2.9203453E−05 |
| A8 | 2.6146767E−05 | −8.5243190E−06 |
| A9 | −4.4375384E−06 | 5.0776942E−06 |
| A10 | 2.6652010E−07 | −9.3767813E−07 |
| A11 | 2.2379409E−08 | 3.1920514E−09 |
| A12 | −3.1146059E−09 | 1.8896795E−08 |
| A13 | −1.1900030E−09 | −2.5908547E−09 |
| A14 | 3.3810099E−10 | 1.4991103E−10 |
| A15 | −3.1998496E−11 | −1.7533672E−12 |
| A16 | 1.0759893E−12 | −1.6260314E−13 |

| | Surface Number | |
|---|---|---|
| | 12 | 13 |
| KA | 8.6368139E−01 | 1.2015365E+00 |
| A4 | −5.3696590E−07 | 8.7628554E−05 |
| A6 | −4.2140008E−07 | 4.2717282E−07 |
| A8 | 1.9049099E−08 | −5.5860605E−08 |
| A10 | 5.2874523E−10 | 6.1771113E−10 |
| A12 | 1.8003018E−11 | 2.8037465E−10 |
| A14 | 2.4642133E−13 | 1.1214600E−12 |
| A16 | −1.1639331E−14 | −3.3762480E−13 |
| A18 | −6.0123325E−16 | 2.0922875E−15 |

EXAMPLE 3

Figure 5:
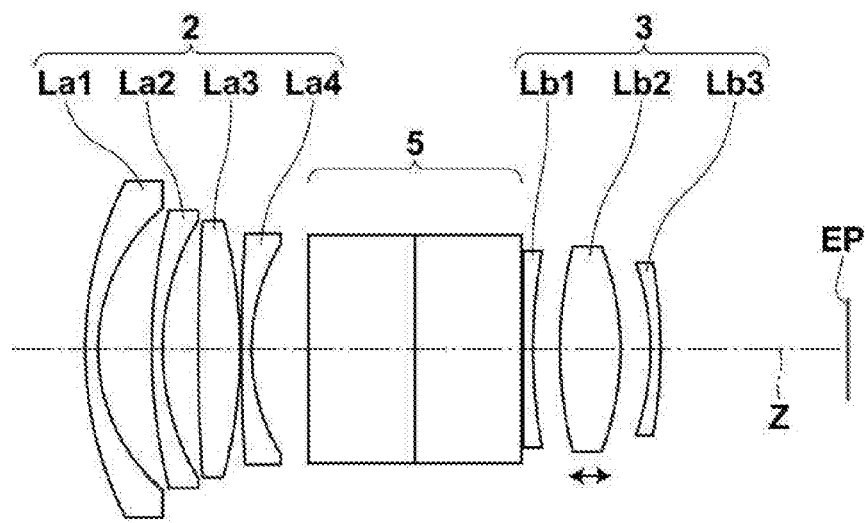
FIG. 5 is a cross sectional diagram that illustrates the configuration of an observation optical system of a finder of Example 3 of the present disclosure.
Figure 6:
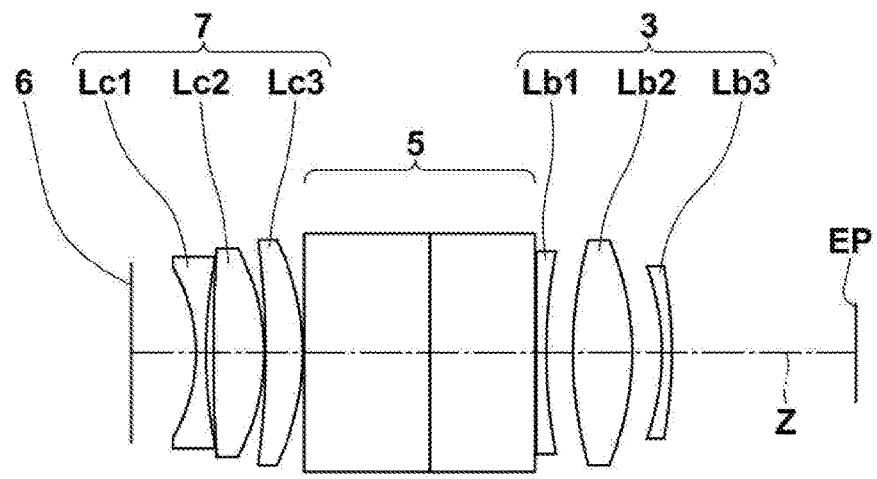
FIG. 6 is a cross sectional diagram that illustrates the configuration of a display optical system of the finder of Example 3 of the present disclosure.

Example 3 is suited as a configuration of a finder which is compatible with the angle of view of a photography lens having a 35 mm equivalent focal length of approximately 21 mm. FIG. 5 and FIG. 6 are cross sectional diagrams of an observation optical system and a display optical system of the finder of Example 3, respectively.

The observation optical system illustrated in FIG. 5 is constituted by, in order from the object side to the eye point side, an objective lens group 2 having a negative refractive power, an optical path combining member 5, which is a prism, and an eyepiece lens group 3 having a positive refractive power. The objective lens group 2 is constituted by, in order from the object side to the eye point side, a negative lens La1, a negative lens La2, a positive lens La3, and a negative lens La4. The eyepiece lens group 3 is constituted by, in order from the object side to the eye point side, a negative first lens Lb1, a positive second lens Lb2, and a negative third lens Lb3. Only the second lens Lb2 moves in the direction of the optical axis during diopter adjustment.

The display optical system illustrated in FIG. 6 is constituted by, in order from a display member 6 to the eye point side, the display member 6, a target lens group 7, the optical path combining member 5, which is a prism, and the eyepiece lens group 3 having a positive refractive power. The target lens group 7 is constituted by, in order from the side of the display member to the eye point side, a negative lens Lc1, a positive lens Lc2, and a positive lens Lc3. A semitransmissive film for combining optical paths is provided within the prism. The prism combines the optical path of the target lens group 7 provided outside the optical path of the observation optical system and the optical path of the observation optical system. Thereby, display of the display member 6 is overlapped onto observation images.

Figure 11:
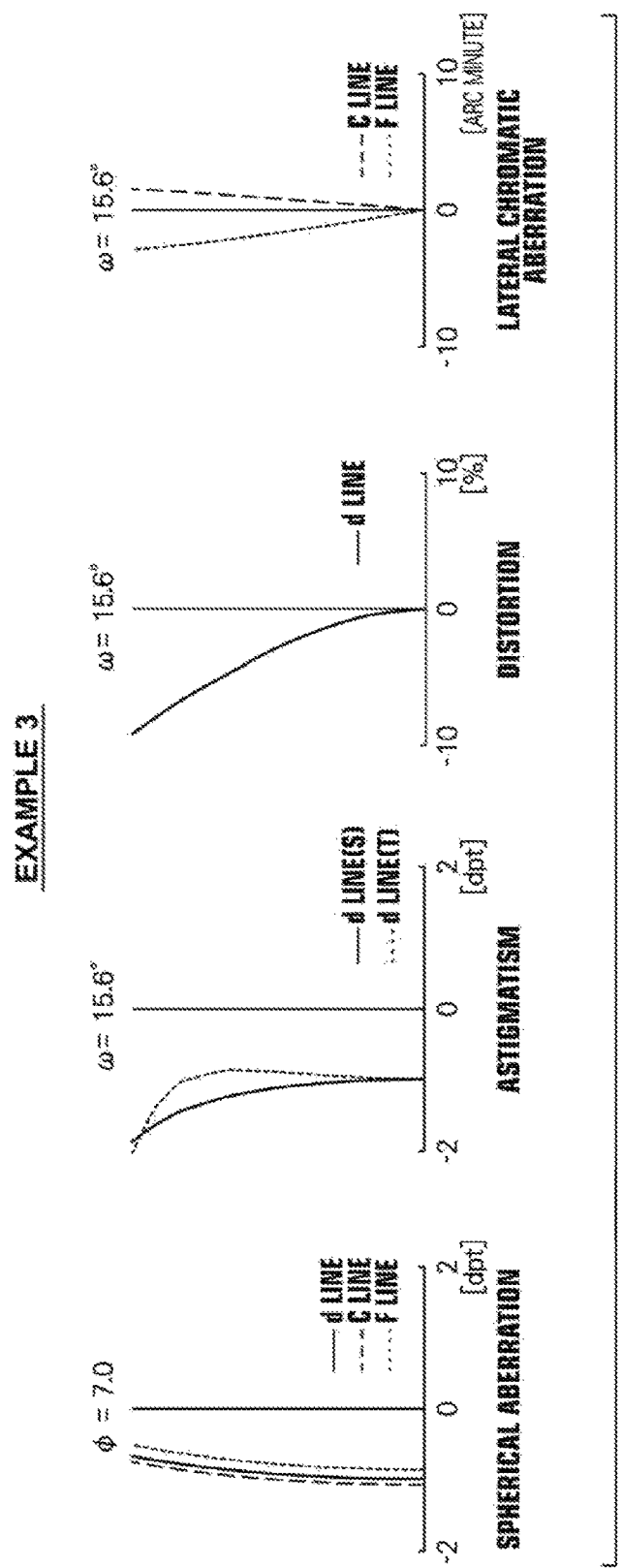
FIG. 11 is a collection of diagrams that illustrate aberrations of an observation optical system of the finder of Example 3, that illustrate spherical aberration, astigmatism, distortion, and lateral chromatic aberration in this order from the left side of the drawing sheet.

Basic lens data, variable distances between surfaces, and various items related to the d line are shown in Table 7 for the observation optical system. Basic lens data and various items related to the d line are shown in Table 8 for the display optical system. FIG. 11 is a collection of diagrams that illustrate various aberrations of the observation optical system in a state in which the diopter is −1.

TABLE 7

Example 3: Observation Optical System

Basic Lens Data

| Si | Ri | Di | Ndj | vdj |
|---|---|---|---|---|
| 1 | 26.0188 | 0.9000 | 2.00100 | 29.13 |
| 2 | 13.1400 | 3.7669 | | |
| 3 | 39.9797 | 0.7500 | 1.88100 | 40.14 |
| 4 | 17.6349 | 2.5050 | | |
| 5 | 131.4932 | 2.9329 | 1.95906 | 17.47 |
| 6 | −34.9003 | 0.1000 | | |
| 7 | 136.6860 | 0.7000 | 1.88300 | 40.76 |
| 8 | 14.2946 | 3.9690 | | |
| 9 | ∞ | 7.5000 | 1.51680 | 64.20 |
| 10 | ∞ | 7.5000 | 1.51680 | 64.20 |
| 11 | ∞ | 0.1000 | | |
| 12 | ∞ | 0.7000 | 2.00100 | 29.13 |
| 13 | 37.9841 | DD [13] | | |
| 14 | 29.4408 | 4.2222 | 1.83481 | 42.72 |
| 15 | −20.3689 | DD [14] | | |
| 16 | −18.1947 | 0.7000 | 1.68893 | 31.07 |
| 17 | −34.0388 | 13.1500 | | |

Variable Distances Between Surfaces

| Diopter | −1.0 dpt | +2.0 dpt | −4.0 dpt |
|---|---|---|---|
| DD [13] | 1.8751 | 3.1604 | 0.7301 |
| DD [14] | 2.1412 | 0.8559 | 3.2863 |

Items

| | |
|---|---|
| Angular Magnification Ratio | 0.302 |
| Apparent Field of View | 31.2 |

TABLE 8

Example 3: Display Optical System

Basic Lens Data

| Si | Ri | Di | Ndj | vdj |
|---|---|---|---|---|
| 1 | ∞ | 4.6006 | | |
| 2 | −11.9380 | 0.7000 | 1.95906 | 17.47 |
| 3 | 34.1142 | 0.5387 | | |
| 4 | 119.6399 | 3.6145 | 1.88300 | 40.76 |
| 5 | −15.6548 | 0.1000 | | |
| 6 | −60.9740 | 2.6848 | 1.81600 | 46.62 |
| 7 | −17.9857 | 0.1000 | | |
| 8 | ∞ | 9.0000 | 1.51680 | 64.20 |
| 9 | ∞ | 7.5000 | 1.51680 | 64.20 |
| 10 | ∞ | 0.1000 | | |
| 11 | ∞ | 0.7000 | 2.00100 | 29.13 |
| 12 | 37.9841 | DD [13] | | |
| 13 | 29.4408 | 4.2222 | 1.83481 | 42.72 |
| 14 | −20.3689 | DD [14] | | |
| 15 | −18.1947 | 0.7000 | 1.68893 | 31.07 |
| 16 | −34.0388 | 13.1500 | | |

Items

| | |
|---|---|
| Focal Length | 20.85 |
| Apparent Field of View | 34.9 |

EXAMPLE 4

Figure 7:
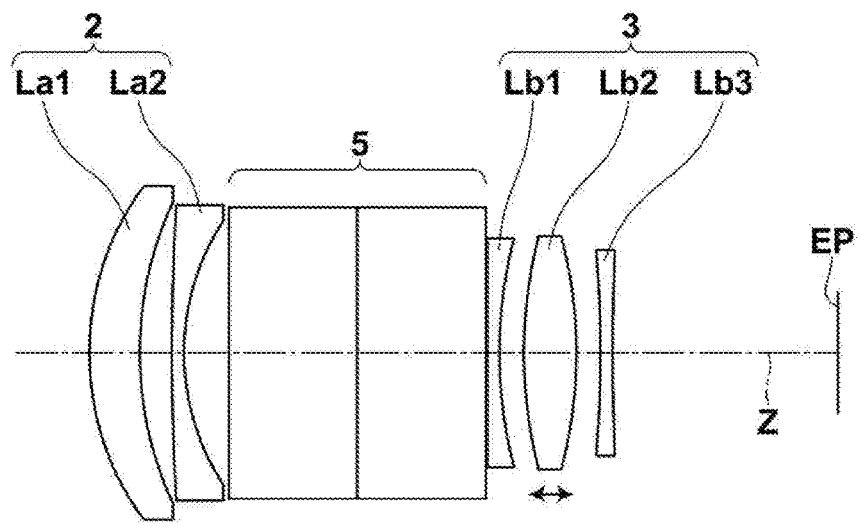
FIG. 7 is a cross sectional diagram that illustrates the configuration of an observation optical system of a finder of Example 4 of the present disclosure.
Figure 8:
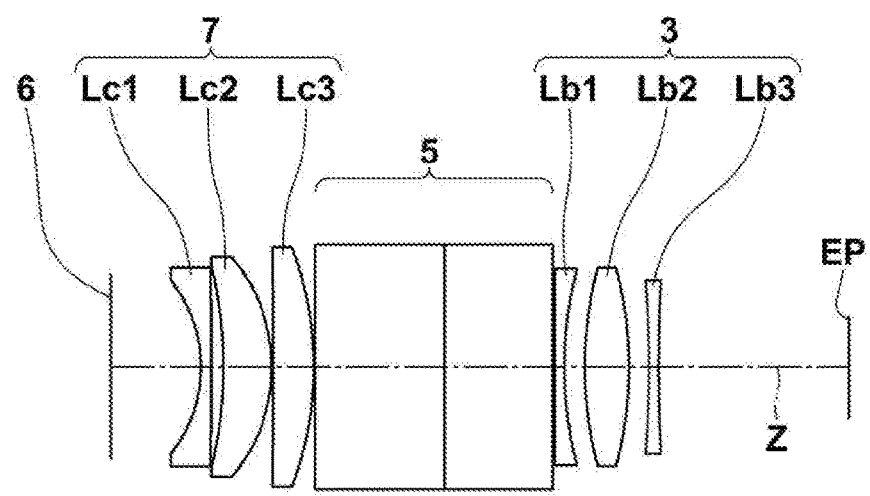
FIG. 8 is a cross sectional diagram that illustrates the configuration of a display optical system of the finder of Example 4 of the present disclosure.

Example 4 is suited as a configuration of a finder which is compatible with the angle of view of a photography lens having a 35 mm equivalent focal length of approximately 60 mm. FIG. 7 and FIG. 8 are cross sectional diagrams of an observation optical system and a display optical system of the finder of Example 4, respectively.

The observation optical system illustrated in FIG. 7 is constituted by, in order from the object side to the eye point side, an objective lens group 2 having a negative refractive power, an optical path combining member 5, which is a prism, and an eyepiece lens group 3 having a positive refractive power. The objective lens group 2 is constituted by, in order from the object side to the eye point side, a positive lens La1 and a negative lens La2. The eyepiece lens group 3 is constituted by, in order from the object side to the eye point side, a negative first lens Lb1, a positive second lens Lb2, and a negative third lens Lb3. Only the second lens Lb2 moves in the direction of the optical axis during diopter adjustment.

The display optical system illustrated in FIG. 8 is constituted by, in order from a display member 6 to the eye point side, the display member 6, a target lens group 7, the optical path combining member 5, which is a prism, and the eyepiece lens group 3 having a positive refractive power. The target lens group 7 is constituted by, in order from the side of the display member to the eye point side, a negative lens Lc1, a positive lens Lc2, and a positive lens Lc3. A semitransmissive film for combining optical paths is provided within the prism. The prism combines the optical path of the target lens group 7 provided outside the optical path of the observation optical system and the optical path of the observation optical system. Thereby, display of the display member 6 is overlapped onto observation images.

Figure 12:
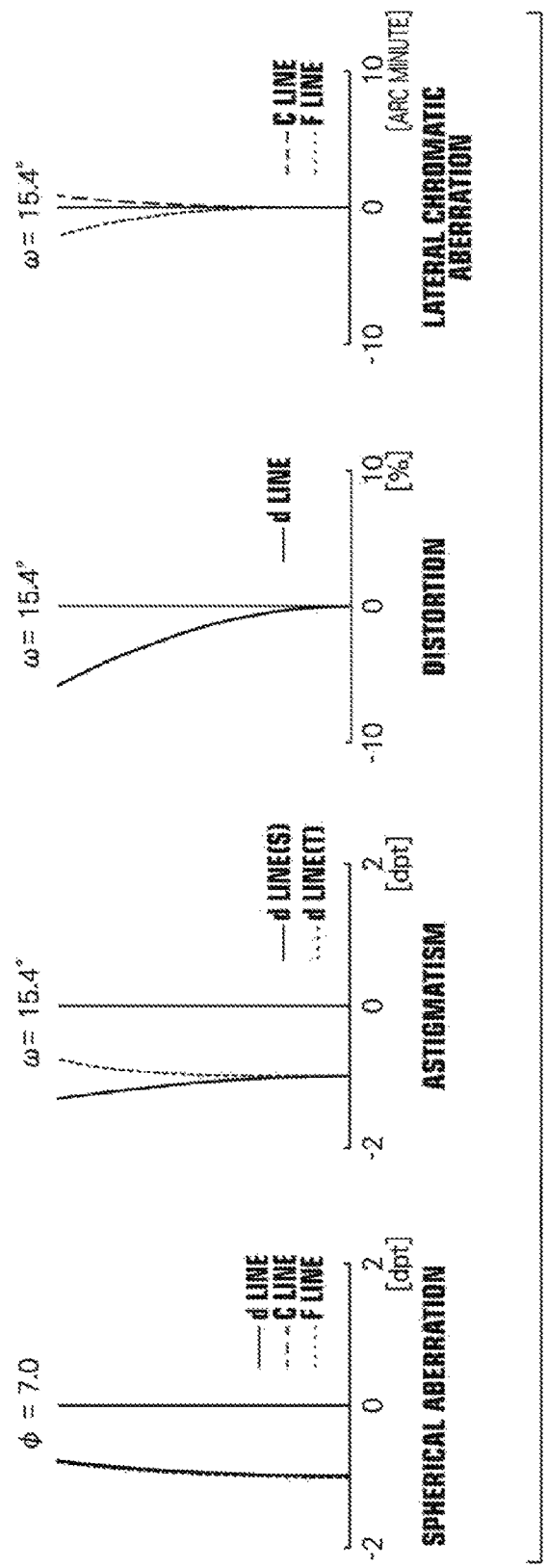
FIG. 12 is a collection of diagrams that illustrate aberrations of an observation optical system of the finder of Example 4, that illustrate spherical aberration, astigmatism, distortion, and lateral chromatic aberration in this order from the left side of the drawing sheet.

Basic lens data, variable distances between surfaces, and various items related to the d line are shown in Table 9 for the observation optical system. Basic lens data and various items related to the d line are shown in Table 10 for the display optical system. FIG. 12 is a collection of diagrams that illustrate various aberrations of the observation optical system in a state in which the diopter is −1.

TABLE 9

Example 4: Observation Optical System

Basic Lens Data

| Si | Ri | Di | Ndj | vdj |
|---|---|---|---|---|
| 1 | 16.5785 | 2.9320 | 2.00272 | 19.32 |
| 2 | 20.9148 | 1.8765 | | |
| 3 | 148.0395 | 0.7000 | 1.91082 | 35.25 |
| 4 | 14.0199 | 2.6344 | | |
| 5 | ∞ | 7.5000 | 1.51680 | 64.20 |
| 6 | ∞ | 7.5000 | 1.51680 | 64.20 |
| 7 | ∞ | 0.1000 | | |
| 8 | 477149.5261 | 0.7000 | 1.92119 | 23.96 |
| 9 | 26.5687 | DD [9] | | |
| 10 | 26.9969 | 3.0611 | 1.88300 | 40.76 |
| 11 | −26.3758 | DD [11] | | |
| 12 | −69.7220 | 0.7000 | 1.54072 | 47.23 |
| 13 | 124.7580 | 13.1500 | | |

Variable Distances Between Surfaces

| Diopter | −1.0 dpt | +2.0 dpt | −4.0 dpt |
|---|---|---|---|
| DD [9] | 1.3556 | 2.4587 | 0.3265 |
| DD [11] | 1.4692 | 0.3661 | 2.4982 |

Items

| | |
|---|---|
| Angular Magnification Ratio | 0.658 |
| Apparent Field of View | 30.7 |

TABLE 10

Example 4: Observation Optical System

Basic Lens Data

| Si | Ri | Di | Ndj | vdj |
|---|---|---|---|---|
| 1 | ∞ | 6.2586 | | |
| 2 | −9.6098 | 0.7000 | 1.95906 | 17.47 |
| 3 | −640.8158 | 0.8560 | | |
| 4 | −29.7850 | 3.3705 | 1.95375 | 32.32 |
| 5 | −11.7580 | 0.1000 | | |
| 6 | −722.9798 | 2.8199 | 1.83481 | 42.72 |
| 7 | −23.7153 | 0.1000 | | |
| 8 | ∞ | 9.0000 | 1.51680 | 64.20 |
| 9 | ∞ | 7.5000 | 1.51680 | 64.20 |
| 10 | ∞ | 0.1000 | | |
| 11 | 477149.5261 | 0.7000 | 1.92119 | 23.96 |
| 12 | 26.5687 | DD [9] | | |
| 13 | 26.9969 | 3.0611 | 1.88300 | 40.76 |
| 14 | −26.3758 | DD [11] | | |
| 15 | −69.7220 | 0.7000 | 1.54072 | 47.23 |
| 16 | 124.7580 | 13.1500 | | |

Items

| | |
|---|---|
| Focal Length | 21.48 |
| Apparent Field of View | 33.9 |

Table 11 shows values corresponding to Conditional Formulae (1) through (3) for the finders of Examples 1 through 4. The values shown in Table 11 use the d line as a reference.

TABLE 11

| Formula | | Example 1 | Example 2 | Example 3 | Example 4 |
|---|---|---|---|---|---|
| (1) | fN/f3 | 0.280 | 0.170 | 0.178 | 0.351 |
| (2) | D/f2 | 0.647 | 0.880 | 0.931 | 0.813 |
| (3) | m · f1/f3 | 0.515 | 0.313 | 0.198 | 0.230 |

As can be understood from the data above, the finders of Examples 1 through 4 are capable of diopter adjustment within a range from −4 diopters to +2 diopters, the amount of movement of the diopter adjusting lens during diopter adjustment is 2.44 mm or less. The amount of movement of the lenses per amount of diopter adjustment is suppressed, and the configuration is advantageous from the viewpoint of miniaturization. In addition, various aberrations are favorably corrected in the finders of Examples 1 through 4, and favorable optical performance is realized.

Figure 13:
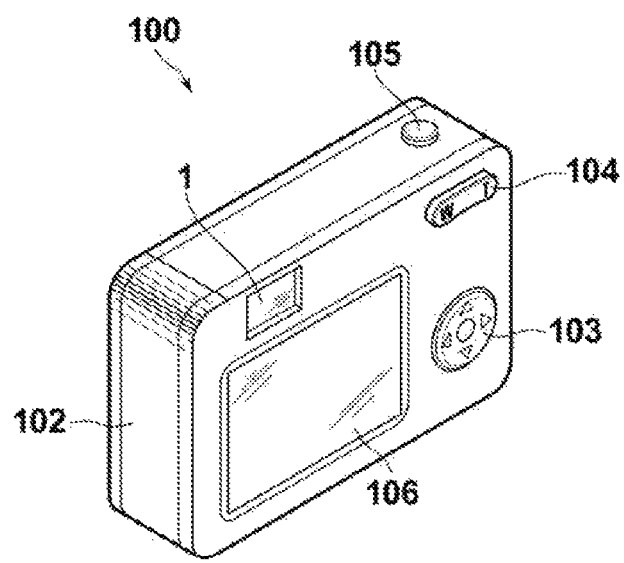
FIG. 13 is a perspective view that illustrates the schematic structure of the rear side of an imaging apparatus according to an embodiment of the present disclosure.

Next, an imaging apparatus according to an embodiment of the present disclosure will be described. FIG. 13 is a perspective view that illustrates the schematic structure of the rear side of a camera 100 as an imaging apparatus according to an embodiment of the present disclosure. The camera 100 is equipped with the finder 1 of the embodiment of the present disclosure on the upper portion of a camera body 102. The camera 100 is equipped with operation buttons 103 for performing various settings, a zoom lever 104 for performing zooming operations, and a monitor 106 for displaying images and various setting screens on the rear side of the camera body 102. A shutter release button 105 is provided on the upper surface of the camera body 102. In the camera 100, images of subjects formed by an imaging lens (not shown) provided on the front surface of the camera body 102 are formed on the image capturing surface of an imaging element (not shown). An operator observes a finder image of a subject by viewing through the finder 1 from the rear side. Note that FIG. 13 illustrates an example in which the finder is built in to the camera 100. However, the present disclosure may be applied to externally mounted finders as well. In addition, the imaging apparatus of the present disclosure is not limited to the example illustrated in FIG. 13. The present disclosure may be applied to a video camera or the like, for example.

The present disclosure has been described with reference to the embodiments and Examples. However, the present disclosure is not limited to the above embodiments and Examples, and various modifications are possible. For example, the numerical values of the radii of curvature, the distances between surfaces, the refractive indices, the Abbe's numbers, the aspherical surface coefficients, etc. of the lenses are not limited to those exemplified in the above Examples, and may be different values.

What is claimed is:

1. A reverse Galileo type finder comprising, in order from the object side to the eye point side:
   an objective lens group having a negative refractive power; and
   an eyepiece lens group having a positive refractive power;
   the distance between the objective lens group and the eyepiece lens group being the longest distance from among distances between lenses, as an air converted length, in an observation optical system from the objective lens group to the eyepiece lens group;
   the eyepiece lens group consisting of, in order from the object side to the eye point side: a first lens having a negative refractive power; a second lens having a positive refractive power; and a third lens having a negative refractive power; and
   the first lens and the third lens being fixed while the second lens moves in the direction of the optical axis during diopter adjustment.

2. A finder as defined in claim 1, in which Conditional Formula (1) below is satisfied:

$$0.05 < fN/f3 < 0.5 \tag{1}$$

wherein fN is the focal length of the objective lens group and f3 is the focal length of the third lens.

3. A finder as defined in claim 2, in which Conditional Formula (1-1) below is satisfied $$0.1 < fN/f3 < 0.4 \tag{1-1}$$

4. A finder as defined in claim 2, in which Conditional Formula (1-2) below is satisfied $$0.15 < fN/f3 < 0.36 \tag{1-2}$$

5. A finder as defined in claim 1, in which Conditional Formula (2) below is satisfied:

$$0.55 < D/f2 < 1.5 \tag{2}$$

wherein D is the air converted length from the lens surface most toward the eye point side within the objective lens group to the lens surface most toward the object side within the eyepiece lens group, and f2 is the focal length of the second lens.

6. A finder as defined in claim 5, in which Conditional Formula (2-1below) is satisfied:

$$0.6 < D/f2 < 1 \tag{2-1}$$

7. A finder as defined in claim 1, in which Conditional Formula (3) below is satisfied:

$$0.1 < m \cdot f1/f3 < 0.8 \tag{3}$$

wherein m is the angular magnification ratio of the observation optical system in a state in which the diopter is −1, f1 is the focal length of the first lens, and f3 is the focal length of the third lens.

8. A finder as defined in claim 7, in which Conditional Formula (3-1) below is satisfied:

$$0.15 < m \cdot f1/f3 < 0.6 \tag{3-1}$$

9. A finder as defined in claim 1, further comprising:
   another optical system separate from the observation optical system, outside the optical path of the observation optical system; and
   an optical path combining member that combines the optical path of the other optical system and the optical path of the observation optical system, provided between the objective lens group and the eyepiece lens group.

10. A finder as defined in claim 9, wherein:
    the other optical system consists of two lenses having positive refractive powers and one lens having a negative refractive power.

11. An imaging apparatus equipped with a finder a defined in claim 1.

* * * * *